(12) United States Patent
McMullen

(10) Patent No.: US 7,447,584 B2
(45) Date of Patent: Nov. 4, 2008

(54) GEAR SHIFT INDICATION METHOD AND APPARATUS

(76) Inventor: John William McMullen, 953 N. 40 W., Orem, UT (US) 84057

( * ) Notice: Subject to any disclaimer, the term of this patent is extended or adjusted under 35 U.S.C. 154(b) by 488 days.

(21) Appl. No.: 11/342,029

(22) Filed: Jan. 28, 2006

(65) Prior Publication Data

US 2007/0179694 A1  Aug. 2, 2007

(51) Int. Cl.
  *G06F 17/00* (2006.01)
(52) U.S. Cl. .................... 701/64; 340/439; 340/441
(58) Field of Classification Search .............. None
  See application file for complete search history.

(56) References Cited

U.S. PATENT DOCUMENTS

| | | | | |
|---|---|---|---|---|
| 4,174,766 A | * | 11/1979 | Kalogerson | 340/439 |
| 4,683,455 A | * | 7/1987 | Kido et al. | 340/439 |
| 6,137,399 A | * | 10/2000 | Westberg et al. | 340/441 |
| 6,567,735 B1 | * | 5/2003 | Bortfeld et al. | 701/52 |
| 7,145,324 B2 | * | 12/2006 | Masters et al. | 324/169 |
| 2004/0093129 A1 | * | 5/2004 | Majstorovic et al. | 701/1 |

* cited by examiner

*Primary Examiner*—Michael J. Zanelli
(74) *Attorney, Agent, or Firm*—Steve McDaniel; Utah Valley Patent

(57) ABSTRACT

A method and apparatus for communicating an optimal gear shift time is disclosed. The apparatus includes an input circuit that obtains a plurality RPM readings over a selected interval of time, a processing module that determines an RPM acceleration based upon the plurality of RPM readings, the processing module also determines an appropriate shift time based upon the RPM acceleration and estimated shift reaction time, and a shift indicator that communicates the appropriate shift time. In certain embodiments, the appropriate shift time includes shifting within a range of maximum engine power. In some embodiments, the shift indicator comprises a shift indicator light or an audible signal generator.

17 Claims, 5 Drawing Sheets

Fig. 1 Engine power output vs RPM

Fig. 2 Speed vs Time (constant Power)

Fig. 4 shows typical engine RPM curve during race

GEAR SHIFT INDICATION METHOD AND APPARATUS

BACKGROUND OF THE INVENTION

1. Field of the Invention

This invention relates generally to gear shifting systems, methods, and apparatus and more particularly relates to gear shift indicator systems, methods, and apparatus.

2. Description of the Related Art

Engine performance is a pervasive focus of automotive development. One critical aspect of engine performance is optimal gear shifting. Optimal gear shifting includes shifting gears within a range of maximum engine power. Shifting gears within a range of maximum engine power enables the vehicle to maintain an optimal rate of acceleration and avoid overburdening the engine.

Suboptimal gear shifting is often due to the driver not knowing the precise moment to shift gears. In an attempt to overcome suboptimal gear shifting due to driver error, certain gear shift indicators have been proposed. For example, one proposed gear shift indicator includes a shift indicator designed to turn on once the RPMs reach a selected value. When the driver sees the shift indicator turn on, the driver knows it is time to shift gears.

However, the foregoing approach works but overlooks a very important factor. For example, the foregoing approach fails to take into account the shift response time between the driver seeing the shift indicator and actually shifting gears. Additionally, the foregoing approach fails to take into account such factors as tire slippage, missed gear transitions, atmospheric conditions, and road conditions.

From the foregoing discussion, it should be apparent that a need exists for an improved gear shift indication apparatus and method. Beneficially, such an apparatus and method would indicate the optimal gear shift time, taking into account the shift response time of the drive, the current gear, and various driving conditions.

SUMMARY OF THE INVENTION

The present invention has been developed in response to the present state of the art, and in particular, in response to the problems and needs in the art that have not yet been fully solved by currently available imaging means and methods. Accordingly, the present invention has been developed to provide a system, method, and apparatus for indicating a gear shift time that overcome many or all of the above-discussed shortcomings in the art.

In one aspect of the present invention, an apparatus for communicating an optimal gearshift time includes an input circuit that obtains multiple RPM readings at a selected rate, an acceleration estimation module that determines an RPM acceleration based upon the plurality of RPM readings, a shift time estimation module that determines an appropriate shift time based upon the RPM acceleration and an estimated shift reaction time, and a shift indicator that communicates the appropriate shift time.

In certain embodiments, the estimated shift reaction time is provide by a reaction time estimator. In one embodiment, the reaction time estimator receives input from a shift point monitor. In one embodiment, the shift point monitor is configured to monitor whether an actual shift occurs in accordance with the appropriate shift time. In such embodiments, the shift point monitor determines a time difference between the appropriate shift time and the actual shift time. The shift point monitor also may communicate the time difference if the time difference is great than a selected time.

In some embodiments, the appropriate shift time includes shifting within a range of maximum engine power. In certain embodiments, the shift indicator does not communicate the appropriate shift time if the RPM acceleration is greater than a selected value. The shift indicator may include an indicator light or other means of communication such as an audible signal generator, a vibrator or the like.

In another aspect of the present invention, a method for communicating an optimal gearshift time includes obtaining a plurality of RPM readings at a selected rate, receiving an estimated shift reaction time, determining an RPM acceleration based upon the plurality of RPM readings, determining an appropriate shift time based upon the RPM acceleration and shift reaction time, and communicating the appropriate shift time.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The aforementioned features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Some of the functional units described in this specification have been explicitly labeled as modules, (while others are assumed to be modules) in order to emphasize their embodiment independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
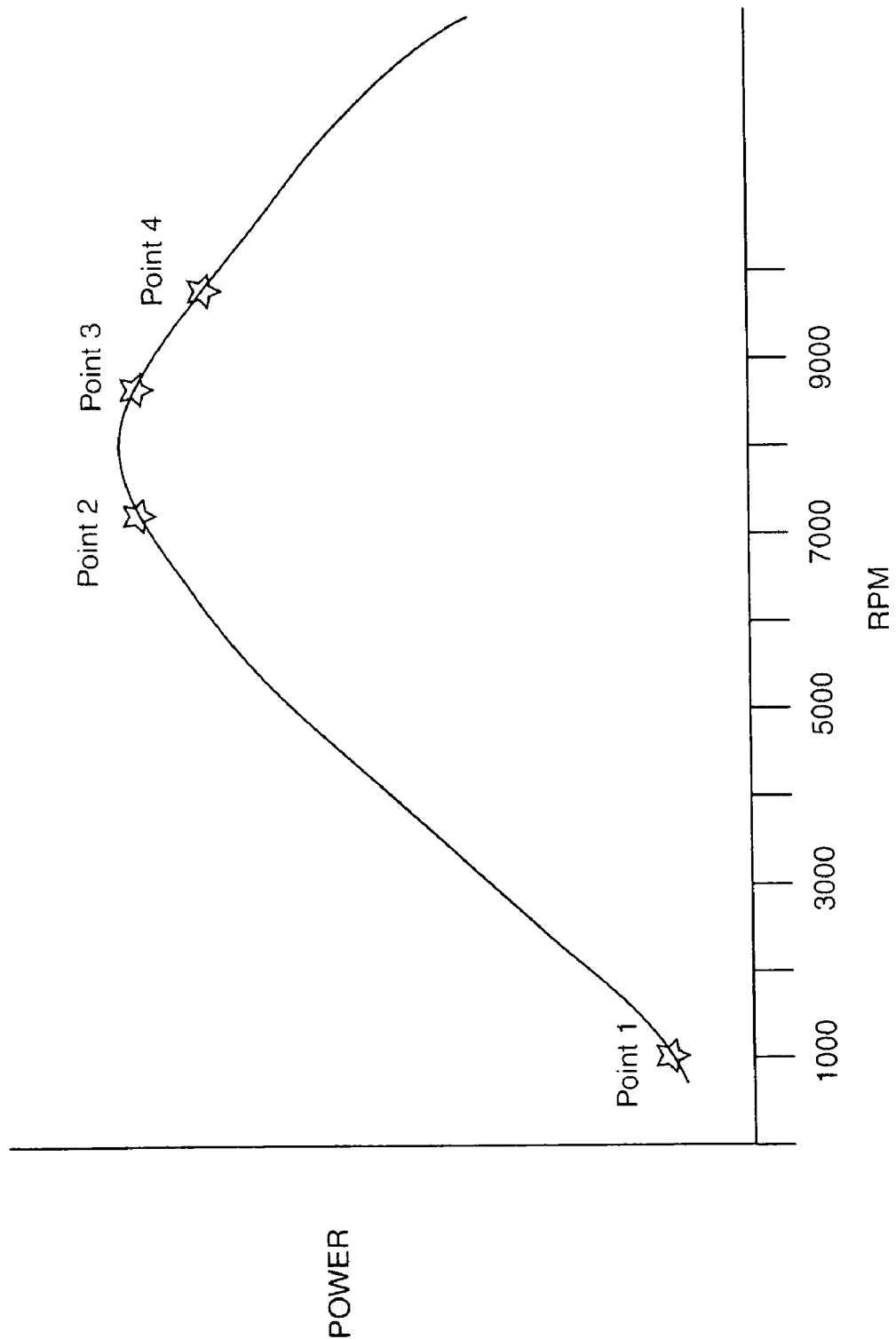
FIG. 1 is an engine output graph illustrating the typical power curve of a high-performance engine.

FIG. 1 shows a typical "power curve" of a high-performance engine. This Figure is provided only as a reference for further discussion of the overall operation of the present invention and may vary for different engine types. For example, the peak power for a racing motorcycle engine may occur at 14,000 RPM and a diesel motor may have peak power at 4,000 RPM. Engine manufacturers and professional drivers closely monitor their performance curves as they seek the optimum performance of their engines during development and modification. A dynamometer is one instrument available to measure the power output of their engines under varying conditions.

Point 1 shows the relatively low power of the subject engine at idle. As fuel is applied the engine RPM increases and the efficiency of the engine improves. At Point 2 the increase in the power output curve is still increasing but the rate of increase begins to reduce due to factors such as friction in the engine, the forces associated with the mass of the pistons as they change direction in the cylinders, the shorter burn time and expansion time as the fuel burns in the cylinders, and the efficiency limitations associated with injecting the fuel and removing the exhaust gasses from the cylinders at higher rotation speeds.

At Point 3 the power curve begins to decline rapidly due to these same factors identified for Point 2 which can no longer be overcome by adding more fuel. If Point 4 is ever reached the engine is operating well below peak power and further car acceleration is affected. It is in this area that an inexperienced driver may think that their car is performing optimally but, in reality, the experienced driver has shifted to a higher gear ratio and is enjoying more power output in the optimum area of the power curve—which relates directly to improved acceleration—and pulling ahead of the inexperienced driver.

Figure 2:
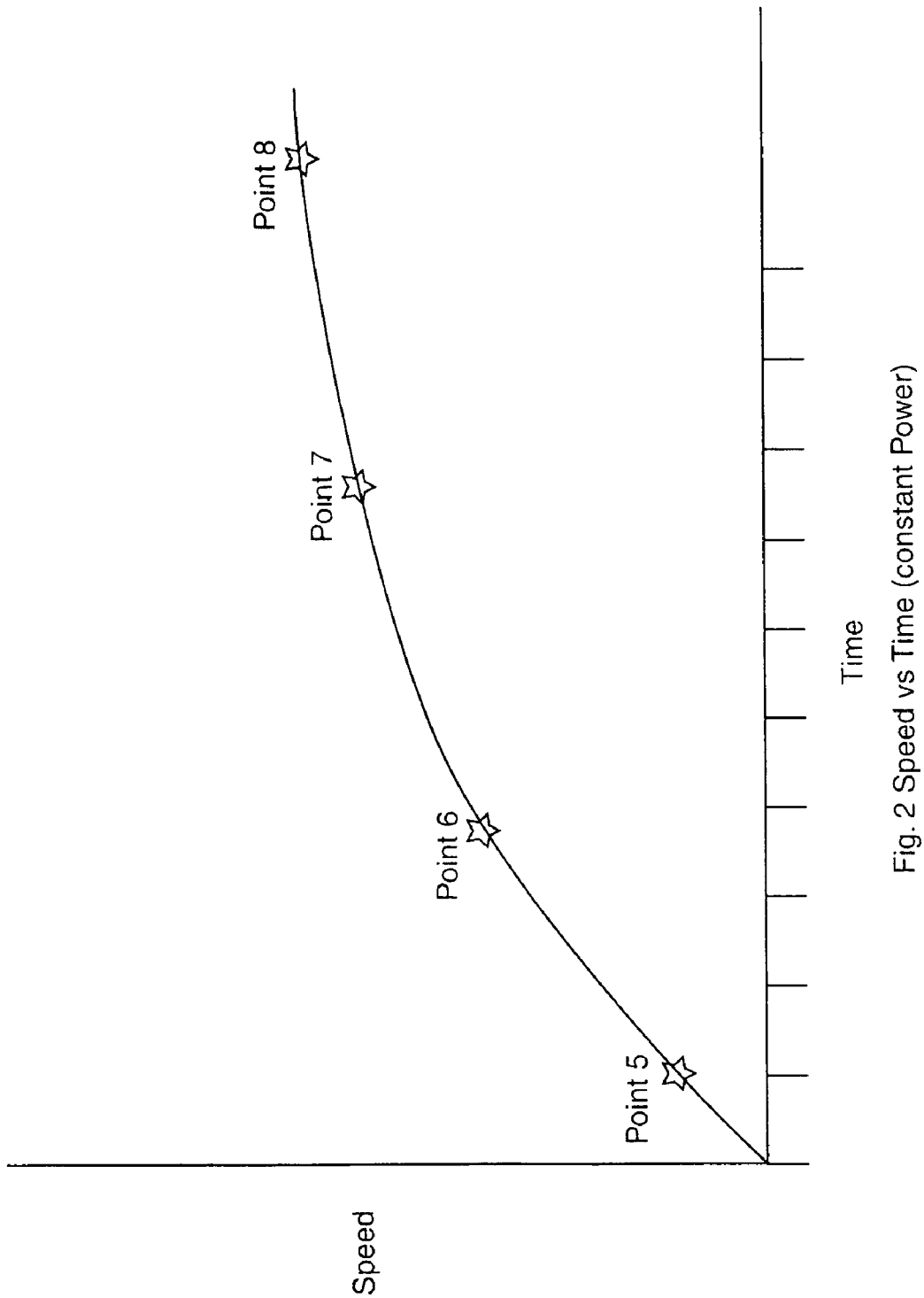
FIG. 2 is a vehicle speed graph illustrating an expected speed curve under constant engine conditions.

FIG. 2 shows the expected speed curve assuming constant power is available and no gear shifting is available. The slope of the curve represents the acceleration at any particular point in time. Point 5 shows rapid acceleration. The speed is relatively low and friction from air, bearings, tire rotation, and road conditions is not a significant factor. As Point 6 and Point 7 are reached, wind resistance is becoming much more of a factor. Acceleration is slowed, as represented by the reduction of the slope of the curve at these points.

Point 8 represents the maximum speed for the power output of the engine. At this point the forward thrust produced by the engine is directly offset by the resistance of the wind and other environmental conditions. The car will not go faster unless the power output of the engine is increased or the aerodynamic shape of the car is improved to reduce air resistance. It should be apparent from FIG. 1 that maximum power is achieved between Point 2 and Point 3 on that curve and an inexperienced driver operating above Point 3 will be at a serious disadvantage in reaching and maintaining maximum speed.

Present racing tachometers often incorporate a "Shift Light" that may be adjusted to turn on at the upper end of the maximum area of power output as shown at Point 3 in FIG. 1. When the driver sees this light he or she knows that it is time to shift to a higher gear ratio. This will lower the engine RPM and maintain optimum power output. This approach works but overlooks a very important factor in the overall analysis of the performance of the car and driver. As the car reaches higher and higher speeds the driver continues to shift to a higher gear ratio to maintain optimum power but, as shown in FIG. 2, the increase in acceleration reduces and therefore it takes significantly longer to reach each succeeding gear shift point.

In other words, with all variables equal, the change in RPM from the instant the shift indicator is activated until the driver changes gears varies depending on which gear he is currently in. This causes the driver to effectively shift around the optimum shift point. The driver can compensate for this by lowering the shift point RPM setting so that the shift indicator comes on earlier for lower gears. But this approach may cause a situation at higher speeds where the engine acceleration is lower and the shift indicator comes on too soon. The driver will waste an important part of the power curve if this occurs.

In an attempt to compensate for this problem, some current state-of-the-art racing tachometers incorporate a separate shift point setting for each gear. As each gear ratio is changed the next sequential shift point setting is selected and the indicator light acts accordingly. Patents have been issued for inventions that attempt to overcome these shift-related problems by setting multiple shift points. In theory this works but many factors can interfere with the practical application of this approach. Factors including—tire slippage, missed gear transitions, atmospheric conditions, track conditions for example can all cause the tachometer to misinterpret the shift point. The present invention takes an entirely different approach to these practical problems. Not only does the present invention meet the needs of the drivers and their cars, the present invention does so without incorporating any of the prior inventions.

Figure 3:
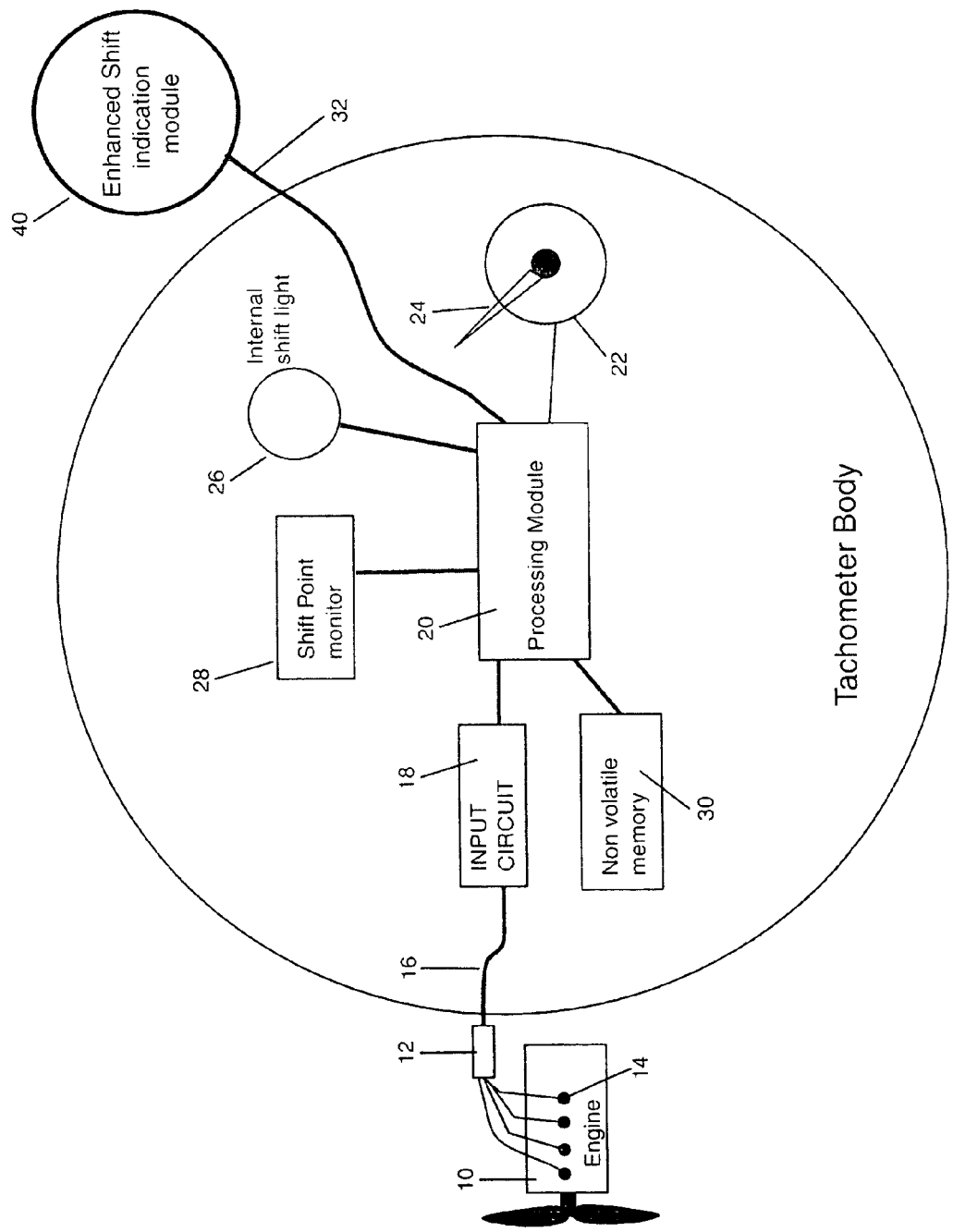
FIG. 3 a schematic block diagram of one embodiment of a gear shift indicator in accordance with the present invention.

FIG. 3 shows a diagram of one embodiment of the present invention. It should be noted that, although FIG. 3 shows the functional modules housed in two physical packages, a tachometer and an enhanced shift indication module 40, it is possible to combine all, or any combination, of the modules into one housing to produce a tachometer that incorporates the enhanced shift indication module 40. In certain embodiments, a shift indicator is embodied as an enhanced shift indicator 40. The enhanced shift indicator 40 may be produced without the RPM display typically associated with a tachometer. Also, the depicted embodiment incorporates a digital stepper motor to move the pointer of the tachometer, and LEDs to light the shift indicator display. It would be equally valid to utilize a digital RPM display, an analog meter movement, a monochrome or color graphical display, and any of a variety of single or multi-color light devices to indicate the optimal shift point or points. In some embodiments sound, vibration, or a form of 'heads-up' display device may be used to indicate to the driver when the optimal shift point has been reached.

A description of each of the modules in FIG. 3 is provided: A car engine 10 has an ignition system 12 which activates each of the engine sparkplugs 14 to ignite the fuel in the associated engine cylinder. The ignition system 12 creates an electrical impulse, which is carried by a wire 16 to the tachometer input circuit 18. The input circuit 18 processes the impulse to prevent damage to the rest of the tachometer circuitry, to remove extraneous electrical noise prevalent in automobile circuitry, and to combine multiple impulses sometimes utilized to reduce fuel consumption or improve engine efficiency. This input circuit 18 is well known art for an engineer skilled in automotive electronic design.

The output pulses from the input circuit 18 are fed directly to an input of a processing module 20. The processing module 20 times each individual pulse and determines the instantaneous engine speed (RPM) each engine cycle. This RPM information is then used to move a stepper motor 22 connected to a pointer 24 that indicates the current motor speed. In other embodiments the processing module 20 could control an analog meter movement or a digital display device to indicate the current RPM of the engine 10.

Some tachometers include an internal 26 or remote shift indicator 40. The processing module 20, or other circuitry used by the respective tachometer manufacturers, compares the current RPM value with one or more preset values. When the preset level has been reached the shift indicator 26 and/or 40 turns on to indicate that it is time to shift to a higher gear ratio thereby keeping the engine 10 RPM value within the optimum power output curve as shown between point 2 and point 3 in FIG. 1. In certain embodiments, a reaction time estimator may integrated into the shift point monitor 28. Alternately, the reaction time estimator may be a sub-module within the processing module 20 or the enhanced shift indication module 40.

In various embodiments, the appropriate shift point(s) may be specified by the driver via a reaction time input device (not shown) or extracted by the shift point monitor 28 and saved in the non-volatile memory 30. In one embodiment, the reaction time input device is integrated into the shift point monitor 28. In another embodiment, the reaction time input device is integrated into the enhanced shift indication module 40.

In certain embodiments, the processing module 20 may be embodied as a microprocessor 20 and associated firmware. In certain embodiments, the processing module 20 provides the current RPM value and additional information to an enhanced shift indication module 40. In one embodiment, the processing module 20 conveys this information via a serial communications bus 32.

Figure 5:
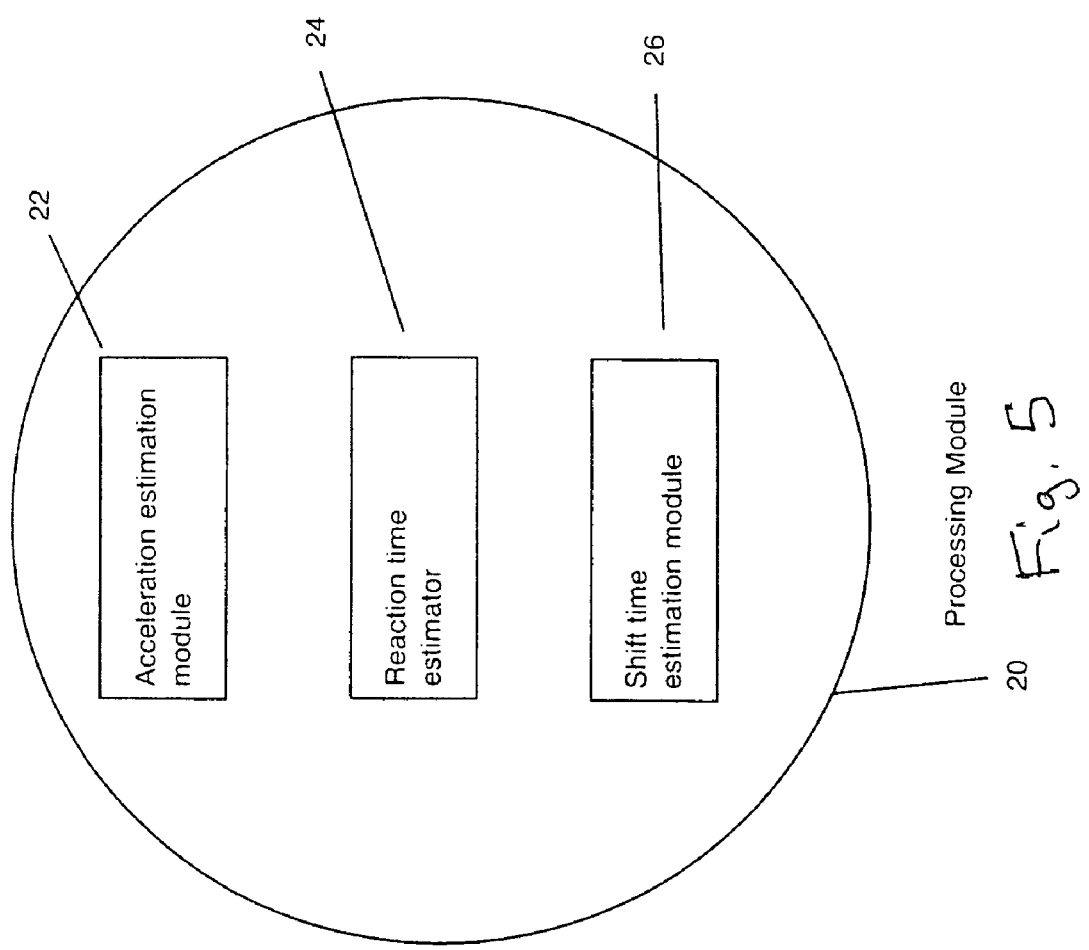
FIG. 5 is a block diagram of one embodiment of a processing module of the present invention.

The processing module 20 may contain a number of sub-modules such as an acceleration estimation module, a reaction time estimator, and a shift time estimation module (see FIG. 5). In one embodiment, the sub-modules comprise software routines. Alternately, the functions of the sub-modules and the shift point monitor 28 may be incorporated into the enhanced shift indication module 40.

The enhanced shift indication module 40 could be built into the tachometer or attached to the tachometer as an external module. The enhanced shift indication module 40 may incorporate the pulse wire 16, the input circuit 18, the shift point monitor or module 28, and the nonvolatile memory 30. Consequently, the present invention could be used in conjunction with a tachometer already installed in a vehicle.

A shift algorithm incorporated into the present invention may utilize a measured engine RPM 10 to determine the acceleration or deceleration of the engine. This acceleration value may updated at a selected rate used to project the remaining time until the preset shift point will be reached. As the engine RPM approaches the desired shift point this projection is updated until, at the optimum time, taking into account the current acceleration and the pre-set driver's response time, the shift indicator is turned on to indicate to the driver that the next higher gear ratio should be selected.

The present invention may require an estimated gearshift reaction time for the driver. This may be determined through practice and estimated by the shift point monitor 28 or entered using a separate input device. As the driver becomes more proficient the reaction time may diminish. For example, an inexperienced driver may perform the gear shift operation in $\frac{1}{2}$ of a second while an experienced driver may shift in $\frac{1}{10}^{th}$ of a second. If an inexperienced driver has preset his or her shift time too short the engine RPM may overshoot the preset shift point by a significant margin and the present invention may flash the shift indicator rapidly. This feature of the present invention therefore provides feedback in gear shifting skill and facilitates improvement. Alternately, the shift point monitor may adjust the estimated reaction time for the driver.

Once the present invention knows the optimum shift point for maximum power (Point 3 in FIG. 1.) and the driver reaction time, the enhanced shift indication module 40 or the processing module 20 utilizes the acceleration value, the current RPM value, and the predetermined optimum shift point setting to turn on the shift indicator at exactly the correct time. External factors such as wind, fuel octane, road conditions, hills and valleys, bearing friction, and atmospheric temperature and pressure may be automatically accommodated by ascertaining the current acceleration. Each of these factors could affect acceleration at any point in time and thus may be incorporated in the calculation of the optimum time to turn on the shift indicator. The result is that the engine 10 is able to spend more time within the optimum power range.

Figure 4:
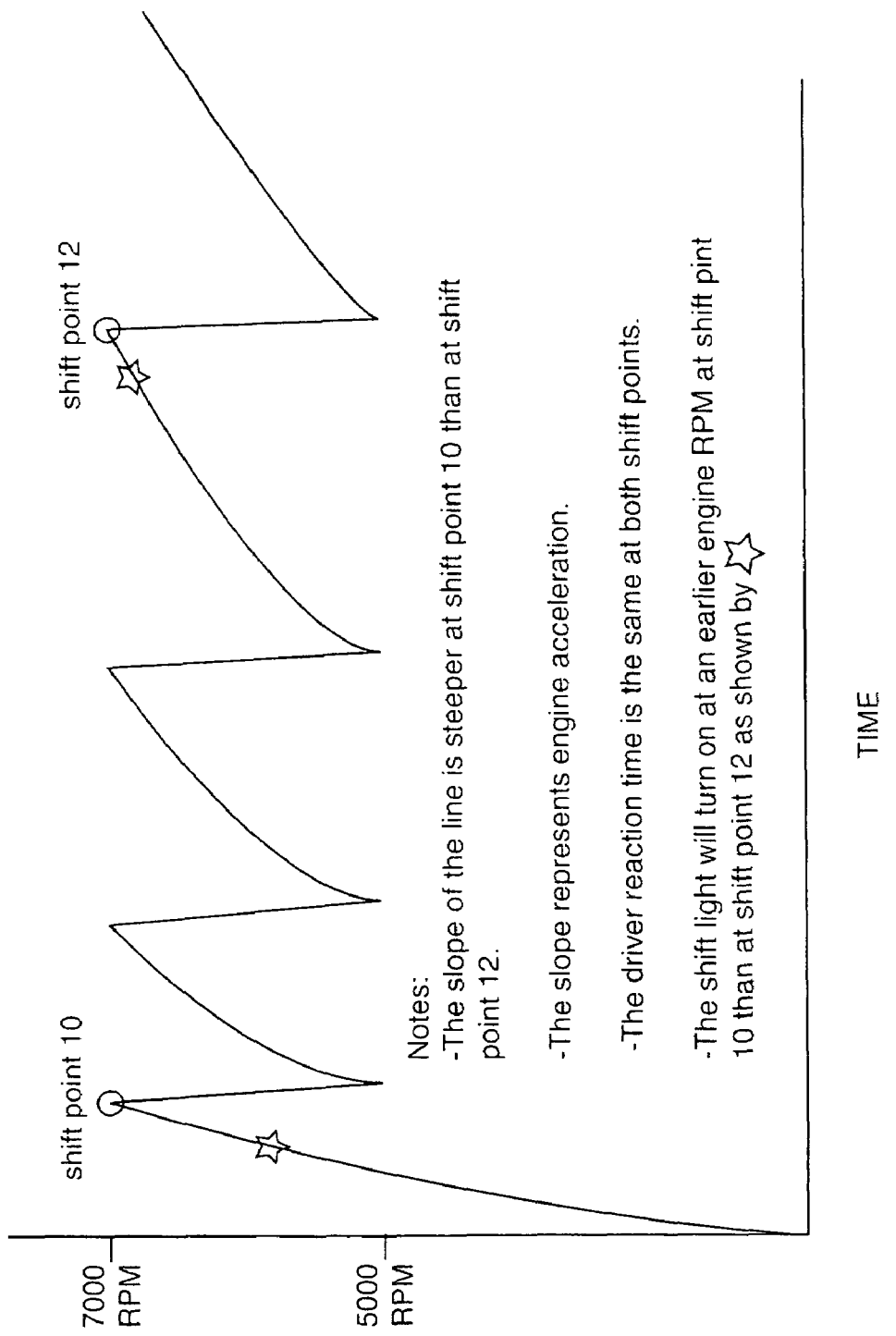
FIG. 4 is a shift point graph illustrating various shift points in accordance with the present invention.

In one embodiment, a timer triggers the operation of the algorithm greater than 100 times each second. This operation rate may be increased or decreased to meet the needs of faster or slower engines. To simplify discussion of the algorithm two examples of gear ratio shift points numbered points 10 and 12 are shown. A graphical representation of these two shift points is provided in FIG. 4.

Shift point 10. A low gear ratio early in a race: optimum shift point setting is 7,000 RPM; driver shift time is $\frac{2}{10}$ths of a second (200 milliseconds), current acceleration near the shift point is 12 (the increase in RPM since the last reading). Shift point 12. A higher gear ratio later in the race: optimum shift point setting is 7,000 RPM, driver shift time is $\frac{2}{10}$ths of a second (200 milliseconds), and the current acceleration near the shift point is 3 (the increase in RPM since the last reading). Note that at shift point 12 the INCREASE in engine RPM is less than at shift point 10 due to many of the factors described earlier in this document.

The algorithm determines the instantaneous RPM when the time of the current engine cycle is known. This can be determined a number of ways but in one embodiment the engine RPM time is directly converted using a table. The next step is to calculate the difference from the last RPM reading. This difference represents the acceleration at that point in time.

Since there are slight variances in the RPM readings due to the digital nature of the timing in the processing module 20 the past several readings may be averaged. This may include the past 7 readings, but any appropriate number of past readings could be used or no averaging at all. The result is a number representing the slope of the speed curve with reference to time. If the resulting number is positive the engine is accelerating. If it is negative the engine is slowing down. The magnitude of the number is the acceleration used later in the algorithm.

The acceleration may be filtered by comparing it to recent readings. If the increase in RPM is VERY rapid it could indicate that the driver is down-shifting and using the engine as a brake. Another possibility is that the wheels are slipping on the road due to lost traction. In either case the acceleration measurements may be filtered and the Shift Indicator may be kept off. The operation of this filter may be changed or eliminated to meet the needs of a particular application without affecting the validity of the present invention.

In one embodiment, an anticipation value is calculated by multiplying current acceleration value with the Driver Shift Time divided by 10 milliseconds. For example, at shift point (10) the 'anticipation' value is (12*(200/10))=240 RPM. At shift point (12). the 'anticipation' value is (3*(200/10))=60 RPM.

The 'anticipation' value may be subtracted from the Optimum shift point setting preset by the driver. For example, at shift point 10 the shift indicator would turn on at 6,760 RPM and at shift point (12) the shift indicator would turn on at 6,940 RPM. At both shift points the driver would shift to the higher gear ratio at the indicated time.

The algorithm presented above is only one possible embodiment of the present invention. Other embodiments may introduce 'weight' to each of the three variables used in the calculation (Shift point, Driver delay, and current RPM). For example, the current RPM calculation may give more 'weight' or significance to the most recent RPM readings and less to earlier RPM readings. Similar 'weighting' may be included with the other variables used in the calculations.

In short, the present invention provides a significant improvement over prior art. By incorporating the driver's shift reaction time into a shift indicator algorithm and using the results of that calculation to anticipate the time to turn on the shift indicator, the driver will be able to shift more accurately and the engine will operate at it's optimum power position for longer periods during a race. The present invention can be incorporated within a tachometer, attached to an existing tachometer that provides the current RPM readings, or may be used as a stand-alone addition to any vehicle with or without a tachometer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for communicating an optimal gearshift time, the apparatus comprising:
    an input circuit configured to obtain a plurality RPM readings;
    an acceleration estimation module configured to determine an RPM acceleration based upon the plurality of RPM readings;
    a shift time estimation module configured to receive an estimated shift reaction time and determine an appropriate shift time based upon the RPM acceleration and the estimated shift reaction time; and
    a shift indicator configured to communicate the appropriate shift time.

2. The apparatus of claim 1, further comprising a reaction time estimator configured to provide the estimated shift reaction time.

3. The apparatus of claim 1, further comprising a shift point monitor configured to monitor whether an actual shift occurs in accordance with the appropriate shift time.

4. The apparatus of claim 3, wherein the shift point monitor is further configured to determine a time difference comprising the time between the appropriate shift time and the actual shift time.

5. The apparatus of claim 1, wherein the appropriate shift time includes shifting within a range of maximum engine power.

6. The apparatus of claim 1, wherein the shift indicator does not communicate the appropriate shift time if the RPM acceleration is greater than a selected RPM acceleration.

7. The apparatus of claim 1, wherein the shift indicator comprises a light.

8. The apparatus of claim 1, wherein the shift indicator comprises an audible speaker.

9. The apparatus of claim 1, further comprising a reaction time input device.

10. A method for communicating an optimal gearshift time, the method comprising:
    obtaining a plurality of RPM readings over a selected interval of time;
    receiving an estimated shift reaction time;
    determining an RPM acceleration based upon the plurality of RPM readings;
    determining an appropriate shift time based upon the RPM acceleration and shift reaction time; and
    communicating the appropriate shift time.

11. The method of claim 10, wherein receiving an estimated shift reaction time comprises obtaining an estimated shift reaction time from a reaction time estimation module.

12. The method of claim 10, further comprising monitoring whether an actual shift occurs in accordance with the appropriate shift time.

13. The method of claim 12, further comprising determining a time difference comprising the time between the appropriate shift time and the actual shift time.

14. The method of claim 10, wherein the appropriate shift time includes shifting within a range of maximum engine power.

15. The method of claim 10, wherein the shift communication module does not communicate the appropriate shift time if the RPM acceleration is greater than a selected RPM acceleration.

16. The method of claim 10, wherein communicating the appropriate shift time comprises turning on a shift indicator light.

17. The method of claim 10, wherein communicating the appropriate shift time comprises communicating an audible signal.

* * * * *